(12) United States Patent
Cariou et al.

(10) Patent No.: US 11,395,265 B2
(45) Date of Patent: Jul. 19, 2022

(54) MULTI-LINK ACKNOWLEDGMENTS IN MULTI-LINK DEVICES

(71) Applicant: Intel Corporation, Santa Clara, CA (US)

(72) Inventors: Laurent Cariou, Portland, OR (US); Dibakar Das, Hillsboro, OR (US); Feng Jiang, Santa Clara, CA (US); Juan Fang, Portland, OR (US); Dmitry Akhmetov, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 77 days.

(21) Appl. No.: 17/083,203

(22) Filed: Oct. 28, 2020

(65) Prior Publication Data

US 2021/0045095 A1    Feb. 11, 2021

Related U.S. Application Data

(60) Provisional application No. 62/926,660, filed on Oct. 28, 2019.

(51) Int. Cl.
*H04W 72/04*    (2009.01)
*H04W 76/15*    (2018.01)

(52) U.S. Cl.
CPC .......... *H04W 72/04* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2018/0167181 A1* | 6/2018 | Montreuil | H04L 5/0007 |
| 2018/0205519 A1* | 7/2018 | Vermani | H04L 27/3461 |
| 2021/0168868 A1* | 6/2021 | Jang | H04L 5/0053 |
| 2021/0307064 A1* | 9/2021 | Ryu | H04W 24/10 |
| 2021/0328741 A1* | 10/2021 | Jang | H04W 74/0816 |
| 2022/0061051 A1* | 2/2022 | Song | H04W 74/00 |

FOREIGN PATENT DOCUMENTS

| | | | | |
|---|---|---|---|---|
| GB | 2585229 A | * | 1/2021 | H04L 1/08 |
| WO | WO-2018071105 A1 | * | 4/2018 | |

* cited by examiner

*Primary Examiner* — Kenny S Lin
(74) *Attorney, Agent, or Firm* — Eversheds Sutherland (US) LLP

(57) ABSTRACT

This disclosure describes systems, methods, and devices related to multi-link acknowledgments. A device may transmit a trigger frame to a station device (STA) multi-link device (MLD), wherein the trigger frame polls the STA MLD to announce presence on communication links. The device may identify a null data packet (NDP) from the STA MLD announcing its presence on a set of communication links. The device may establish the set of communication links with the STA MLD, wherein the STA MLD comprises a plurality of station devices (STAs). The device may allocate a plurality of tone-sets to the plurality of STAs within the STA MLD. The device may identify energy on the allocated tone-sets for each link that the STA MLD has presence on.

20 Claims, 17 Drawing Sheets

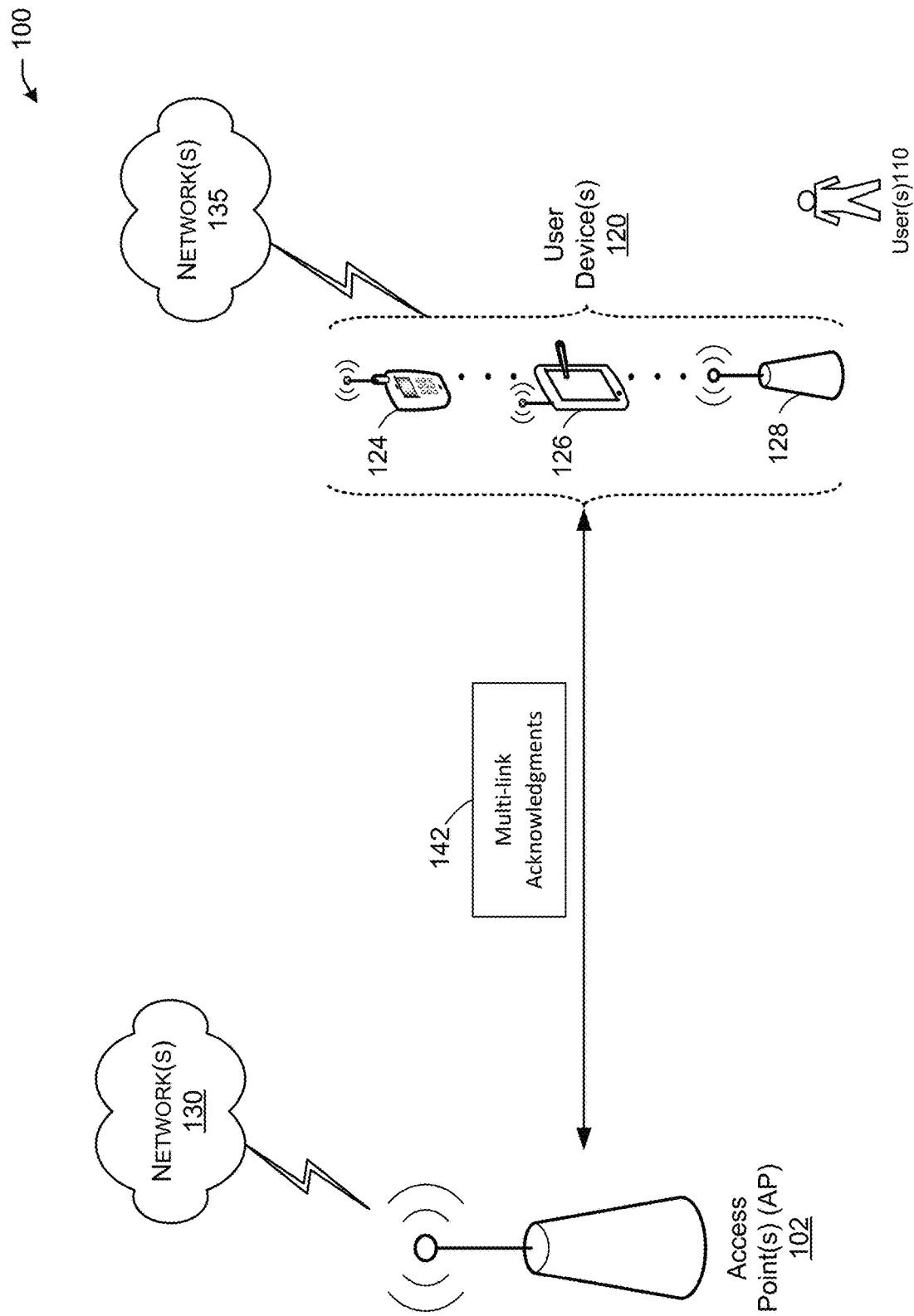

| AID | Number of MPDUs | Starting MPDU Sequence Number | Starting Tone-set index | UL Target RSSI | Multiplexing Flag | Reserved |
|---|---|---|---|---|---|---|
| Bits: 12 | 8 | 8 | 9 | 7 | 1 | 3 |

FIG. 7

MULTI-LINK ACKNOWLEDGMENTS IN MULTI-LINK DEVICES

CROSS-REFERENCE TO RELATED APPLICATION(S)

This application claims the benefit of U.S. Provisional Application No. 62/926,660, filed Oct. 28, 2019, the disclosure of which is incorporated herein by reference as if set forth in full.

TECHNICAL FIELD

This disclosure generally relates to systems and methods for wireless communications and, more particularly, to multi-link acknowledgment in multi-link devices (MLDs).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 1A is a network diagram illustrating an example network environment for multi-link acknowledgments, in accordance with one or more example embodiments of the present disclosure.

FIG. 7 depicts an illustrative schematic diagram for multi-link acknowledgments, in accordance with one or more example embodiments of the present disclosure.

DETAILED DESCRIPTION

Figure 1B:
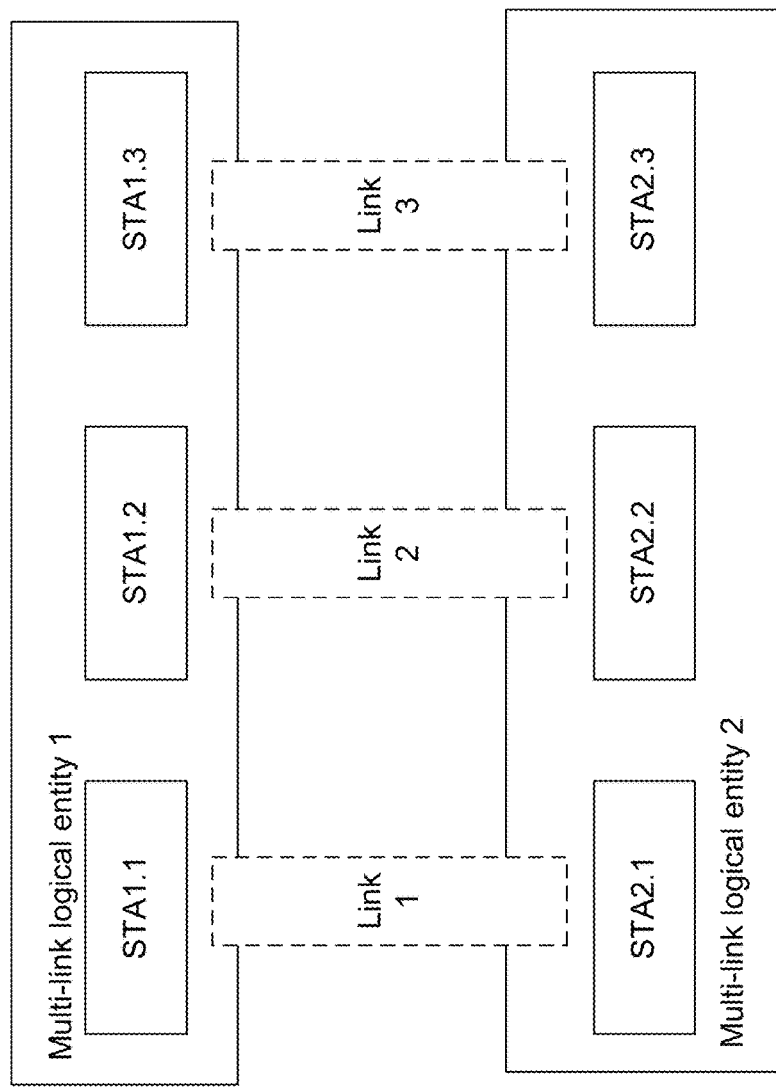
FIG. 1B depicts an illustrative schematic diagram for a multi-link device (MLD) between two logical entities, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Supporting low latency applications is an important feature for extreme high throughput (EHT). Many low latency applications generate one or a few short packets that need to be reliably transmitted within a short time. The delay bound can range from the order of a few 100s of microseconds (us) (e.g., for industrial sensors) to few milliseconds (ms) (e.g., for gaming traffic). For packets with a short latency bound, it is critical to minimize the overhead in acknowledgment so that more time can be allocated to any possible retransmission. However, this may be not possible with current Ack and BlockAck frame formats. For example, using modulation and coding scheme (MCS) 0 resource unit (RU) 2 MHz number of spatial streams (NSS) 1, transmitting an Ack packet requires about 200 us. For BlockAck frames, this is likely to be almost twice as high. Considering that the actual single packet transmission may be under 100 us this constitutes a large relative overhead.

Multi-link operations is yet another EHT feature where an AP MLD can communicate with a STA MLD over multiple links that are not necessarily co-located. However, due to power save restrictions, a STA that is capable of concurrent transmission or reception may be in Doze state in some of the links at a given point of time. It should be noted that MLD is interchangeable with the multi-link logical entity (MLLE). As a simple example, the two MLDs might have negotiated overlapping announced target wake time (TWT) SP on two different links. At the start of a TWT SP the STA is supposed to announce its presence in the link for that SP by transmitting a PS-Poll or QoS Null frame or by responding to a NDP feedback report poll (NFRP) trigger frame (TF). However, with the baseline design, the STA is required to transmit two separate frames on the two links to signal its presence to the AP. The overall latency of the STA signaling its presence to the AP is therefore determined by the worst-case channel access delay by that STA or by the AP (if the PPDU transmissions from the STA are solicited by a TF from the AP). This in turn delays any scheduling resource allocations for that STA by the AP MLD.

In some EHT proposals, the authors have recommended designing a cross-link PS-Poll or power management (PM) bit to signal STA presence in multiple links. The basic design involves adding signaling in some field(s) of a frame that carries per link power state information. In 11ax the NFRP has also been used as a low overhead mechanism for a STA to announce that it is awake. However, it is valid only for that link as 11ax does not define multi-link operations.

Currently, there is no solutions in the IEEE 802.11ax ("11ax") standard to solve the problem of low overhead acknowledgment.

In a proposal, a preamble based Ack scheme is introduced where a station device (STA), following a multi-user (MU) transmission, transmits a physical layer (PHY) protocol data unit (PPDU) without any legacy preamble but containing a SIG-ACK field following the preamble. The SIG-ACK field contains a bitmap corresponding to the received frames. The PPDU is transmitted in the same RU in which the STA received the preceding MU frame.

In another proposal, NAK based Acknowledgement scheme for reliable multicast where a STA in the multicast group signals it did not receive a particular frame by transmitting energy on an LTF corresponding to an assigned resource block. Each resource block corresponds to a particular frame with the start sequence number known from the preceding Block Ack request frame variant. If the sender detects no energy in a particular resource block, it assumes all frames to have been correctly received.

Example embodiments of the present disclosure relate to systems, methods, and devices for multi-link acknowledgments in multi-link devices (MLDs).

In one embodiment, a multi-link acknowledgments system may extend the NFRP design principle to allocate more than one tone-set to a STA MLD to signal its presence on multiple links.

In one embodiment, a multi-link acknowledgments system may extend the NFRP design principle to signal acknowledgments for transmission from STA 1 to STA 2 as follows:
  STA 1 informs STA 2 about the specific resource blocks (e.g., tone-set, RU) to be used for signaling acknowledgement of that frame.
  STA 2 transmits an NDP PPDU variant as acknowledgment where transmits energy on the assigned resource block for each frame.

For the low overhead Ack problem, a benefit is shorter latency (~72 us assuming PPDU format is similar to high efficiency (HE) trigger-based (TB) Feedback NDP). Compared to other techniques, this is a simpler extension as it can be implemented by tweaking existing NFRP implementations. The technique covers the case of unicast packet transmissions.

For the low overhead STA presence, signaling the main benefit is (a) the low latency due to low overhead TF and the corresponding response and (b) the ability to poll a larger set of STAs simultaneously.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment of multi-link acknowledgments, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 10:
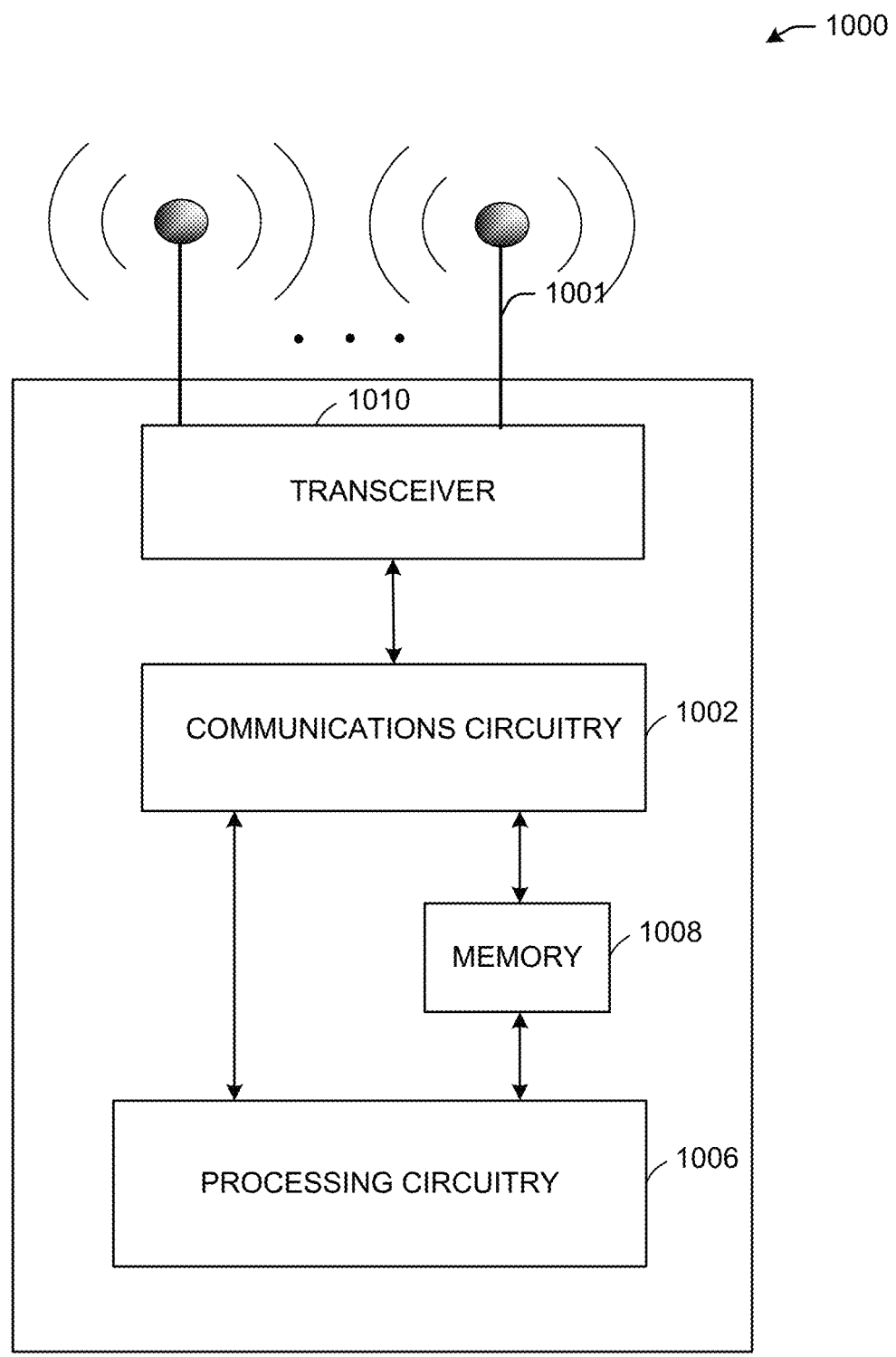
FIG. 10 illustrates a functional diagram of an exemplary communication station that may be suitable for use as a user device, in accordance with one or more example embodiments of the present disclosure.
Figure 11:
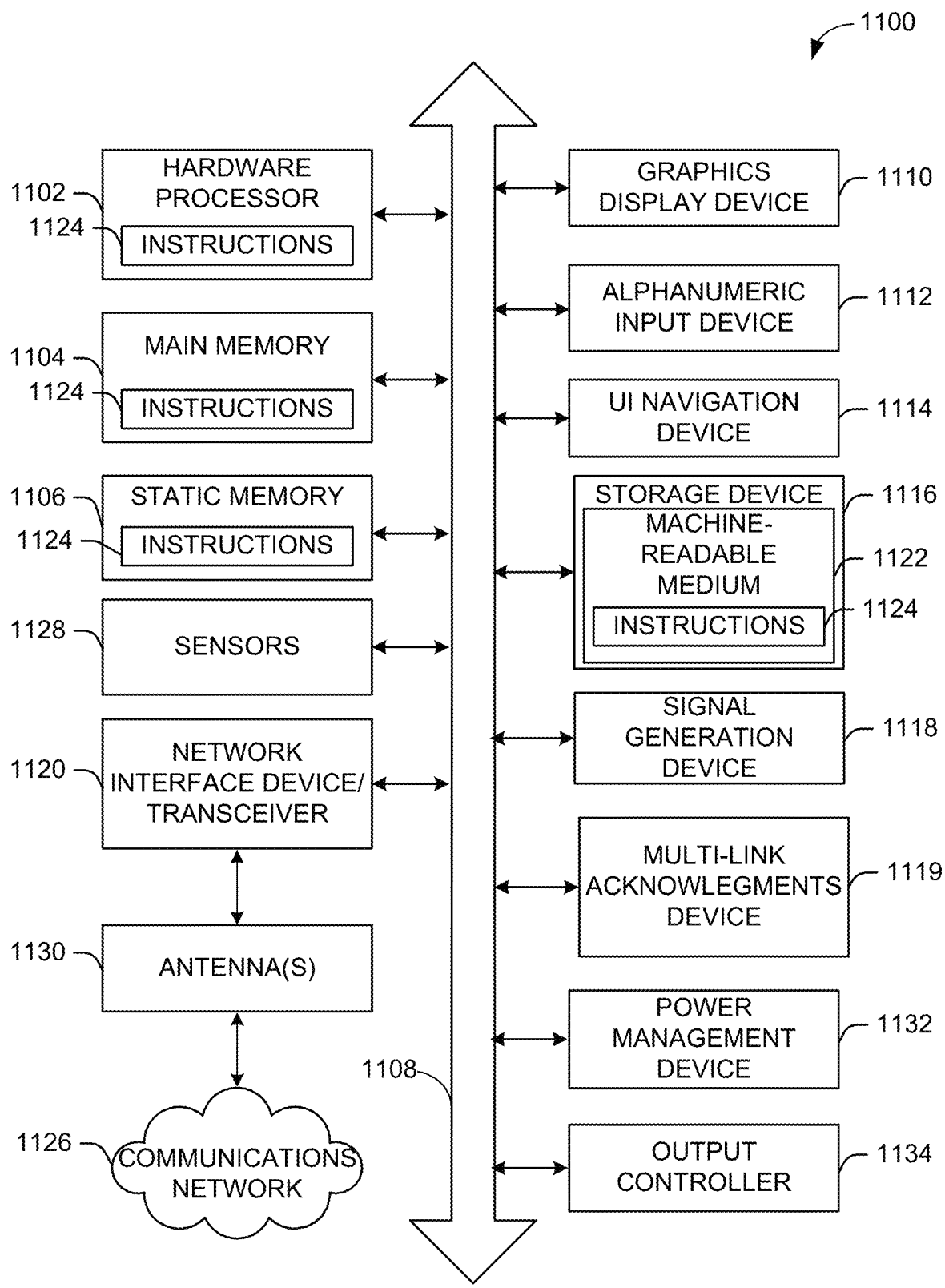
FIG. 11 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 10 and/or the example machine/system of FIG. 11.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, AP 102 may facilitate multi-link acknowledgments 142 with one or more user devices 120.

It is understood that the above descriptions are for purposes of illustration and are not meant to be limiting.

FIG. 1B depicts an illustrative schematic diagram 150 for multi-link device (MLD) between two logical entities, in accordance with one or more example embodiments of the present disclosure.

Referring to FIG. 1B, there are shown two multi-link logical entities on either side which includes multiple STAs that can set up links with each other. A multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name could be changed.

In this example of FIG. 1B, the multi-link logical entity 1 and multi-link logical entity 2 may be two separate physical devices, where each one comprises a number of virtual or logical devices. For example, multi-link logical entity 1 may comprise three STAs, STA1.1, STA1.2, and STA1.3, and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2 and that device STA1.3 is communicating with logical device STA2.3 over link 3.

Figure 1C:
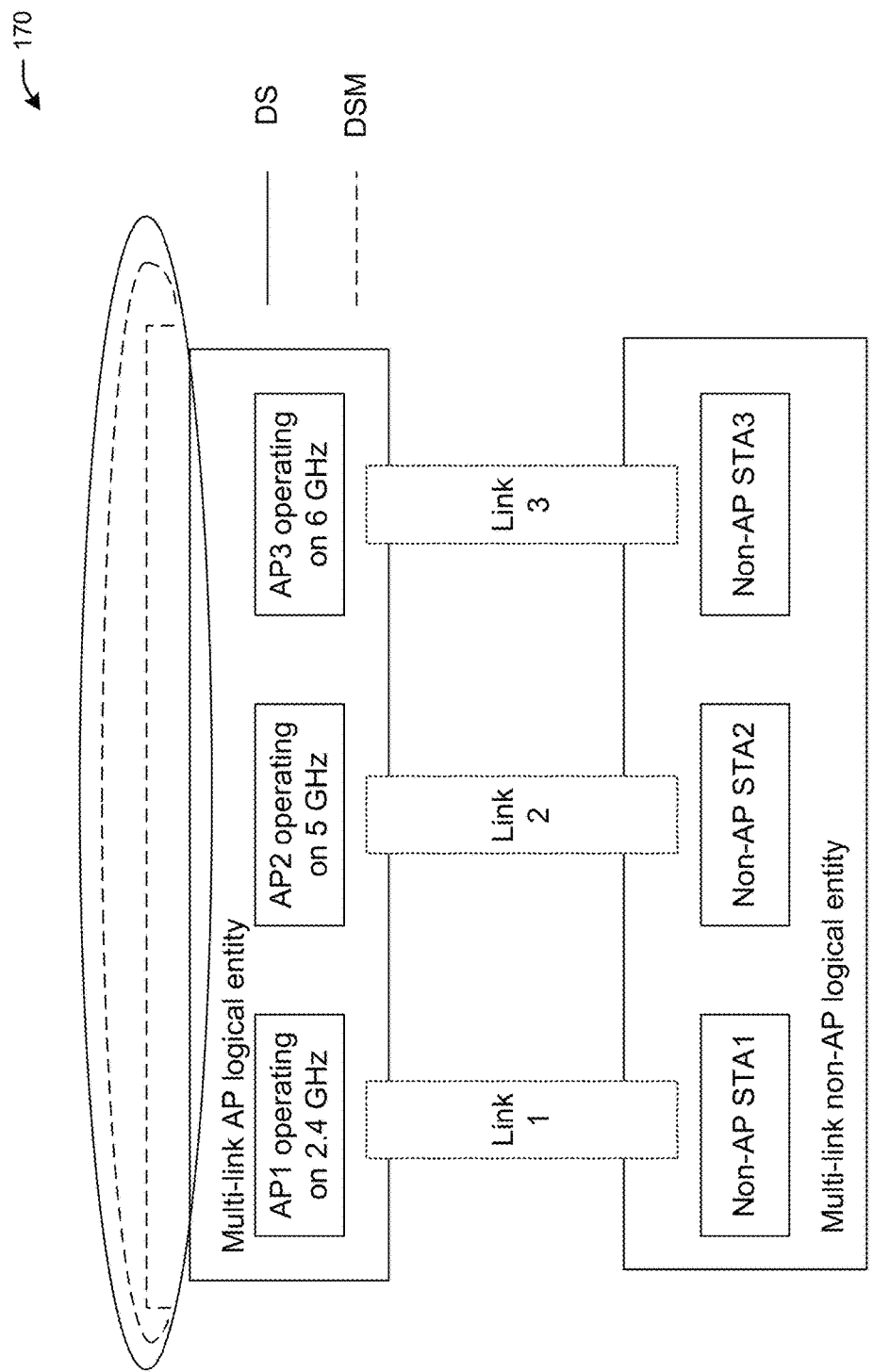
FIG. 1C depicts an illustrative schematic diagram for a multi-link device (MLD) between AP with logical entities and a non-AP with logical entities, in accordance with one or more example embodiments of the present disclosure.

FIG. 1C depicts an illustrative schematic diagram 170 for multi-link device (MLD) between AP with logical entities and a non-AP with logical entities, in accordance with one or more example embodiments of the present disclosure.

Referring to FIG. 1C, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. it should be noted that this framework is a natural extension from the one link operation between two STAs, which are AP and non-AP STA under the infrastructure framework (e.g., when an AP is used as a medium for communication between STAs).

In the example of FIG. 1C, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 1C to have access to a distribution system (DS), which is a system used to interconnect a set of BSSs to create an extended service set (ESS). The multi-link AP logical entity is also shown in FIG. 1C to have access to a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

Figure 2:
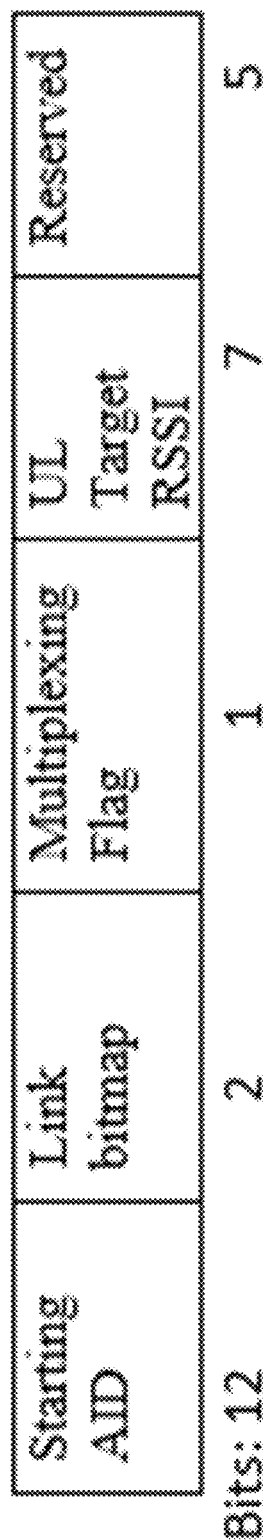
FIG. 2 depicts an illustrative schematic diagram for multi-link acknowledgments, in accordance with one or more example embodiments of the present disclosure.

FIG. 2 depicts an illustrative schematic diagram 200 for multi-link acknowledgments, in accordance with one or more example embodiments of the present disclosure.

Referring to FIG. 2, there is shown an example User Info field for NFRP TF extension to support crosslink STA presence signaling.

Extension of NFRP design for the low overhead STA presence signaling:
  AP MLD transmits an EHT TF variant that polls a set of STAs requesting them to announce presence on multiple links.
  STA MLD transmits an EHT TB NDP PPDU variant that announces their presence in multiple links.
  The NFRP TF extension that supports this feature contains information in the Common Info or the User Info of the TF about the set of links for which it is soliciting STAs to report their presence.

In one embodiment, the information can be just a link bitmap where a bit being set to 1 indicates whether the information for that link at the STA MLD is solicited (in addition to the current link) and is set to 0 otherwise. An example User Info field format is shown in FIG. 2.

In one embodiment, the information can be a set of Operating Class, Channel numbers.

After receiving the TF variant, a STA transmits energy only on the allocated tone-sets for each of the links it participates in. The STA with AID k identifies the first tone-set index allocated to it as (k−Starting AID)*(Number of links). If the STA is not ML capable it may transmit either energy only on the first allocated tone-set or all the ones allocated to it.

Figure 3:
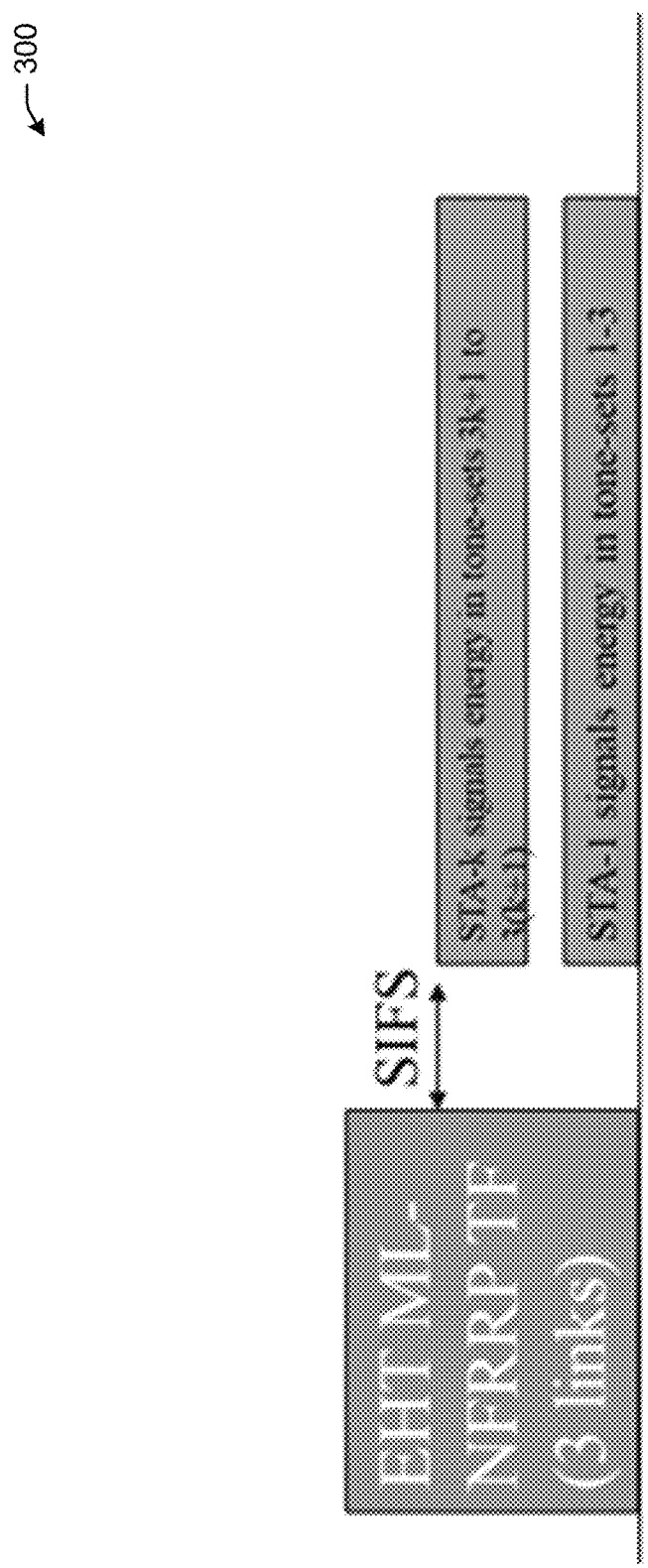
FIG. 3 depicts an illustrative schematic diagram for multi-link acknowledgments, in accordance with one or more example embodiments of the present disclosure.

FIG. 3 depicts an illustrative schematic diagram 300 for multi-link acknowledgments, in accordance with one or more example embodiments of the present disclosure.

Referring to FIG. 3, there is shown an example of how a set of STAs can signal their presence on up to three links that they operate on by transmitting energy on some unique tone-sets allocated to that STA in an EHT ML-NFRP TF variant.

FIG. 3: Example of ML NFRP TF soliciting a set of STAs to signal presence on multiple links.

Extension of NFRP design for the low overhead Ack problem:
  For each data or Mgmt frame, the acknowledgement is transmitted in a preamble by transmitting energy on allocated tone-sets at specific times.
  The sender of the data or Mgmt frame includes information about the time-frequency allocation for that frame either outside or inside that frame (e.g., in A-ctrl field) or a Control frame (e.g., Trigger frame) aggregated with the Data frames.

Figure 4:
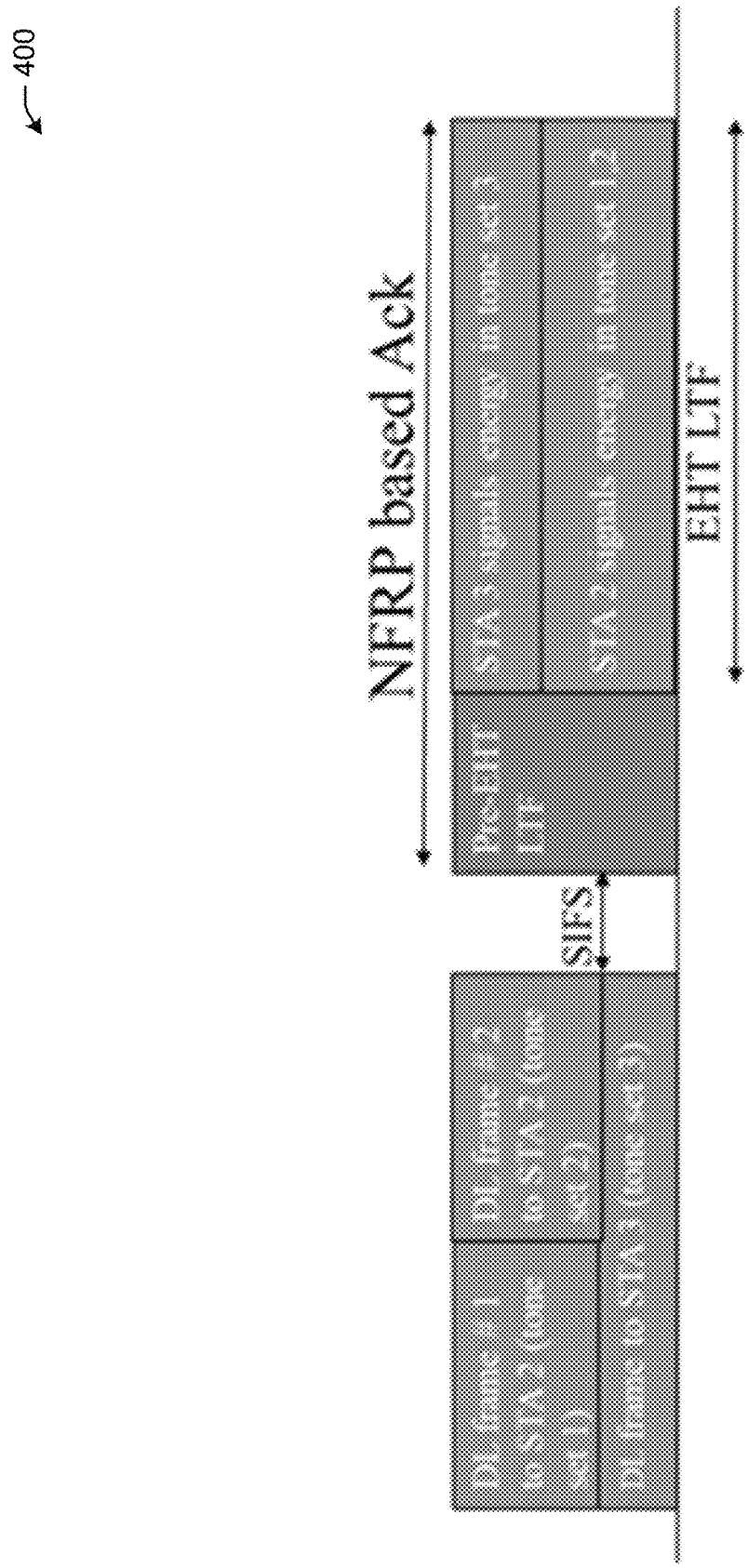
FIG. 4 depicts an illustrative schematic diagram for multi-link acknowledgments, in accordance with one or more example embodiments of the present disclosure.

FIG. 4 depicts an illustrative schematic diagram 400 for multi-link acknowledgments, in accordance with one or more example embodiments of the present disclosure.

Referring to FIG. 4, there is shown an example of the NDP based Ack usage. This is an example of an NDP based Ack scheme using EHT LTFs. In this figure, STA 1 is transmitting two DL frames to STA 2 and one to STA 3 inside a DL MU PPDU using OFDMA. Each frame identifies a set of tones in which the acknowledgment can be sent. As a response both STA 2 and 3 transmits an NDP PPDU in which all the fields up to the EHT LTF field are common. The EHT LTF consists of several tone sets out of which STA 2 picks tone sets #1 and #2 to acknowledge each of its frames while STA 3 picks tone set #3. If STA 1 observes no energy on an allocated tone set it determines that a particular frame was not correctly received.

Figure 5:
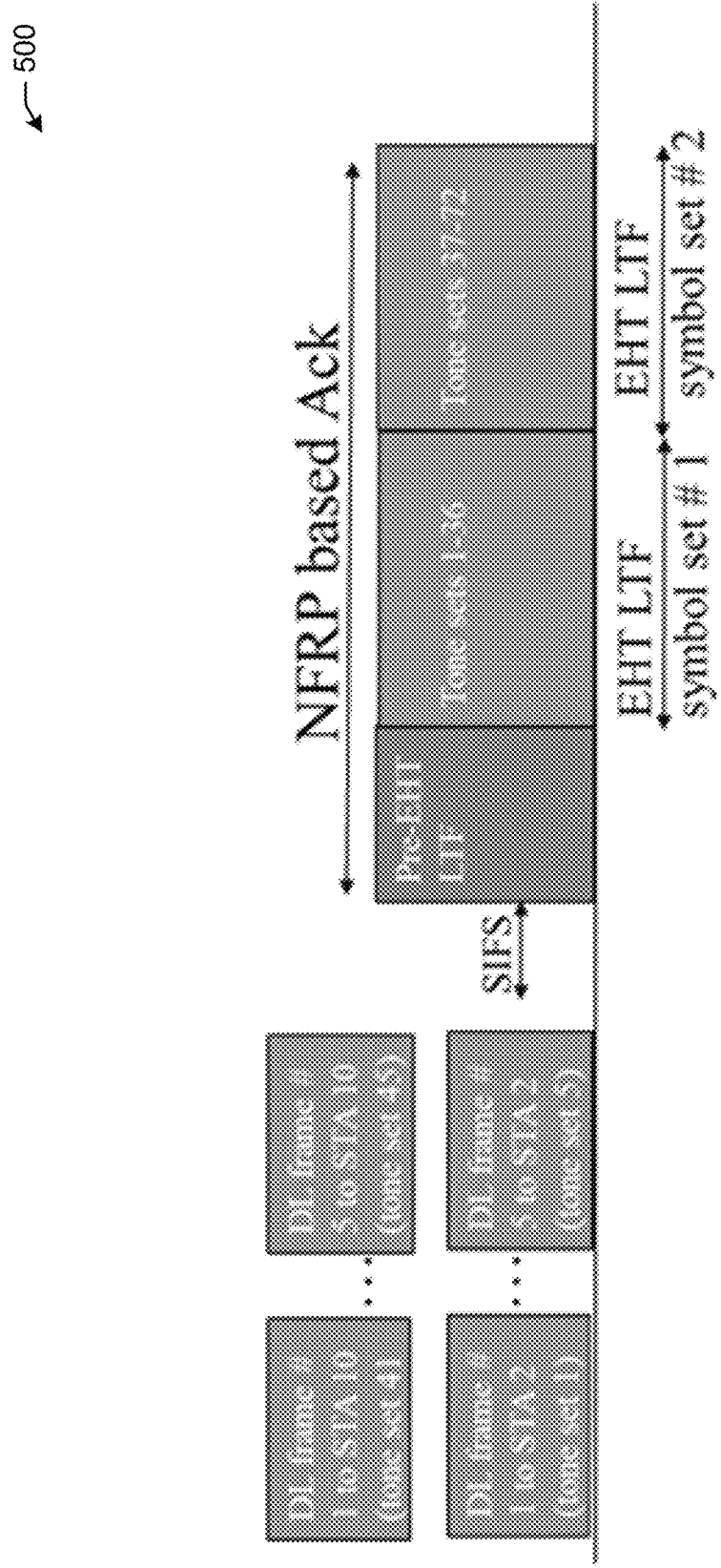
FIG. 5 depicts an illustrative schematic diagram for multi-link acknowledgments, in accordance with one or more example embodiments of the present disclosure.

FIG. 5 depicts an illustrative schematic diagram 500 for multi-link acknowledgments, in accordance with one or more example embodiments of the present disclosure.

Referring to FIG. 5, there is shown an example where tone sets could be spread across different sets of EHT LTF symbols to acknowledge a HE DL MU PPDU. This is an example of NDP based Ack scheme using multiple sets of EHT LTFs. In this case, tone sets 1-36 are mapped to the first two EHT LTF symbols (as in baseline HE TB Feedback NDP). The remaining tone sets are mapped to the next two EHT LTF symbols. This is useful if the number of frames to be acknowledged across all STAs cross the number of tone-sets available with the current design of HE TB Feedback NDP.

Note that an AP or non-AP STA. can also use the above sequence for SU PPDU transmissions.

Note that the above architecture can also be used to signal low overhead Block Ack information from an AP to multiple STAs (i.e., an NDP based variant of MultiSTA BA in 11ax).

Multicast case:

The above technique can be easily extended for reliable multicast where the sender of the multicast frames also want to identify which STAs did not receive the multicast frame. In this case, each STA or a subset of STAs in the multicast group is allocated a unique tone set to signal acknowledgments.

The allocation may be done on two levels where the starting tone set of the entire multicast group for a particular frame is signaled in that frame while the relative tone-set allocation within that subset of tones are identified based on some known signaling (e.g., index of a given STA in that multicast group).

The sender can then retransmit those packets to those STAs using a more reliable technique (e.g., unicast).

Extension to Multi-AP UI case:

In the UL Multi-AP, case a given STA transmits each frame to a group of APs in a Multi-AP set; whether this transmission is to a unicast or group address is TBD. The main goal of acknowledgment here is to deduce whether at least one AP received this frame. Depending on whether the sender also desires acknowledgment information per AP in the set there can be two solutions using the NDP based Ack scheme:

If the sender only requires knowing if the frame has been received by at least one AP, only the AP(s) that received the frame transmits energy on a tone set corresponding to the frame. Note that each tone set is shared across all APs i.e., it is a function of only the frame ID.

If the sender does require knowing the identity of APs that received the frame, each tone set is allocated to a specific AP per frame similar to that in FIGS. 2 and 3. Note that in this case, the tone set allocation is a function of both frame ID and recipient AP ID.

The sender can signal in either the frame or externally about which of the above two modes of acknowledgment it solicits. Note that if the signaling is in a frame it has to be the same across all frames in the container PPDU.

Figure 6:
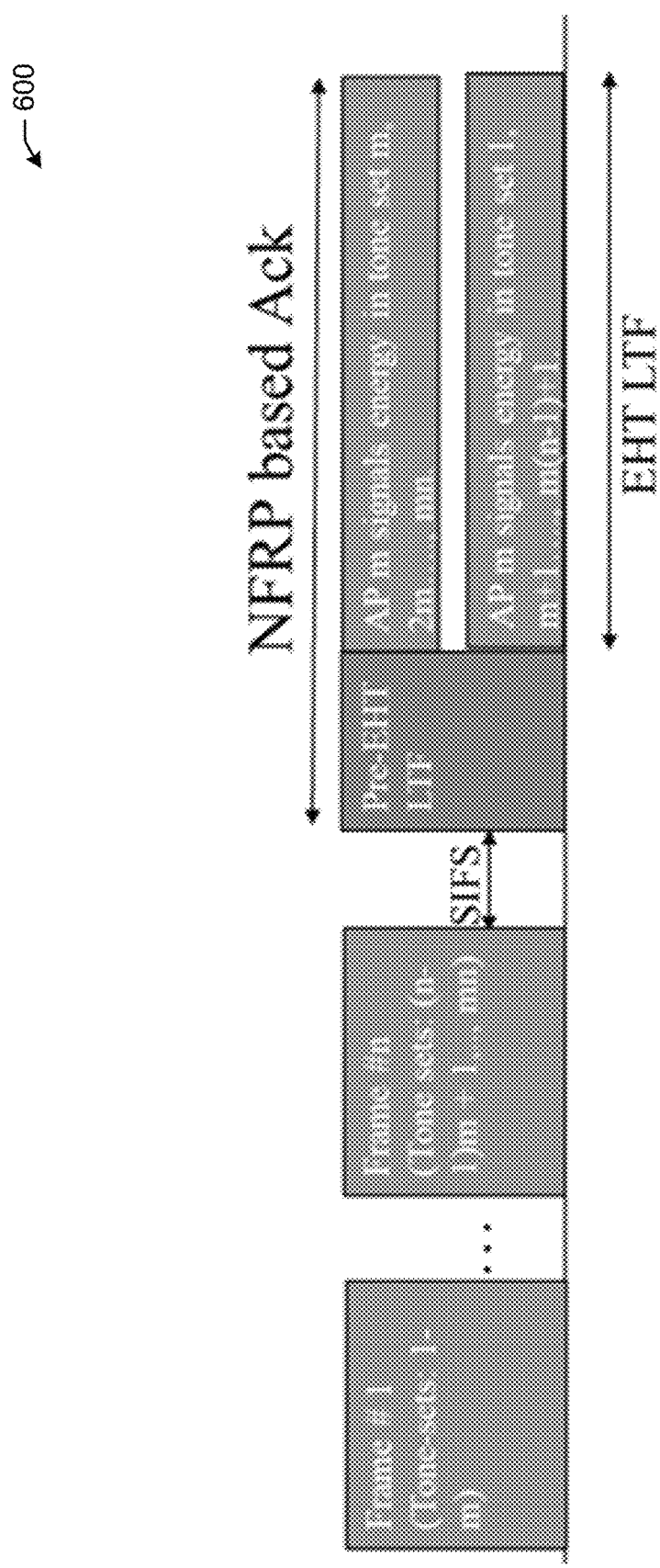
FIG. 6 depicts an illustrative schematic diagram for multi-link acknowledgments, in accordance with one or more example embodiments of the present disclosure.

FIG. 6 depicts an illustrative schematic diagram 600 for multi-link acknowledgments, in accordance with one or more example embodiments of the present disclosure.

Referring to FIG. 6, there is shown an example of the procedure by which a group of m APs to which n frames are sent can signal individually which frames they received. This is an example of an NDP based Ack scheme for Multi-AP UL transmission.

If a TF is used to signal the tone-set allocation information, then it includes information to help each STA identify the tone-set allocated for a particular MPDU. Some example frame format options are listed below.

In one embodiment, this information may be contained in a User Info field of a new EHT Trigger frame. The User Info field contains the AID of the recipient STA of the PPDU aggregated in that RU, the start sequence number of the MPDUs being aggregated, the number of MPDUs that are transmitted, and the starting tone-set index. The number of tone-sets being allocated is equal to the number of MPDUs that are transmitted. The tone-set indices are contiguous starting from the starting tone-set index. The number of User Info fields equal the number of STAs that are intended recipients of the PPDU.

In another embodiment instead of the start sequence number and the number of MPDUs being aggregated with the TF, the User Info field contains a list of sequence numbers of the aggregated MPDUs.

In another embodiment, instead of having contiguous tone-sets allocated to one STA, the User Info field may contain a list of discontinuous allocated tone-set indices. In this case, the Starting tone-set index subfield is not present.

In one embodiment, the UL Target RSSI and the Multiplexing Flag subfields as defined in User Info field of the NFRP Trigger frame are included either in a modified Common Info field or inside one or more User Info fields of the Trigger frame.

FIG. 7 depicts an illustrative schematic diagram 700 for multi-link acknowledgments, in accordance with one or more example embodiments of the present disclosure.

Referring to FIG. 7, there is shown an example format of the User Info field where each User Info field indicates indices of tone-sets allocated to a given STA for Ack signaling. This is an example User Info field of an EHT TF variant that carries Acknowledgement tone-set index information.

If the Acknowledgement information is carried in the A-Control field of an MPDU then it carries the allocated tone-set indices for acknowledging that MPDU and, possibly other MPDUs that are aggregated with that frame.

In one embodiment, the Control Information subfield of the A-Ctrl field contains the following information: the tone-set index allocated to acknowledge the current MPDU.

In one embodiment, the Control Information subfield of the A-Ctrl field can also include the Starting MPDU sequence number and the number of aggregated MPDUs for that STA in the PPDU.

In one embodiment, the UL Target RSSI and the Multiplexing Flag subfields as defined in User Info field of the NFRP Trigger frame are included in the Control Information of the A-Control field.

Figure 8:
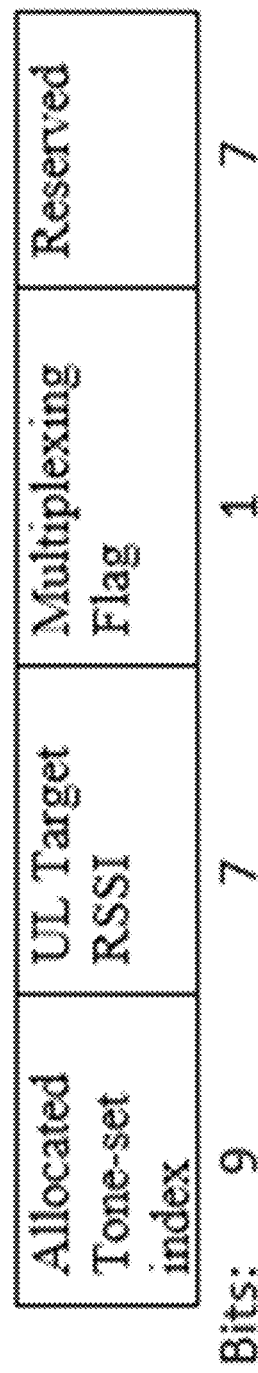
FIG. 8 depicts an illustrative schematic diagram for multi-link acknowledgments, in accordance with one or more example embodiments of the present disclosure.

FIG. 8 depicts an illustrative schematic diagram 800 for multi-link acknowledgments, in accordance with one or more example embodiments of the present disclosure.

Referring to FIG. 8, there is shown an example format of the Control Information field that signals the tone-set index allocated to acknowledge the current MPDU. This is an example Control Information subfield of an A-Ctrl field that carries Acknowledgement tone-set index information.

The pre-EHT long training field (LTF) design in FIGS. 4 and 5 can be different from the one in FIG. 6, because the NFRP based Ack in FIGS. 4, 5 are from STA to AP (uplink), and the NFRP based Ack in FIG. 6 is from AP to STA (downlink). To improve the automatic gain control performance in the uplink transmission, the length of EHT-short training field (STF) field in the uplink NFRP can be two times the length of the EHT-STF field in the downlink NFRP. For example, for uplink NFRP, the duration of EHT-STF field can be 1.6 us with 5 periods, and for the downlink NFRP, the duration of EHT-STF field can be 0.8 us with 5 periods. It is understood that the above descriptions are for purposes of illustration and are not meant to be limiting.

Figure 9:
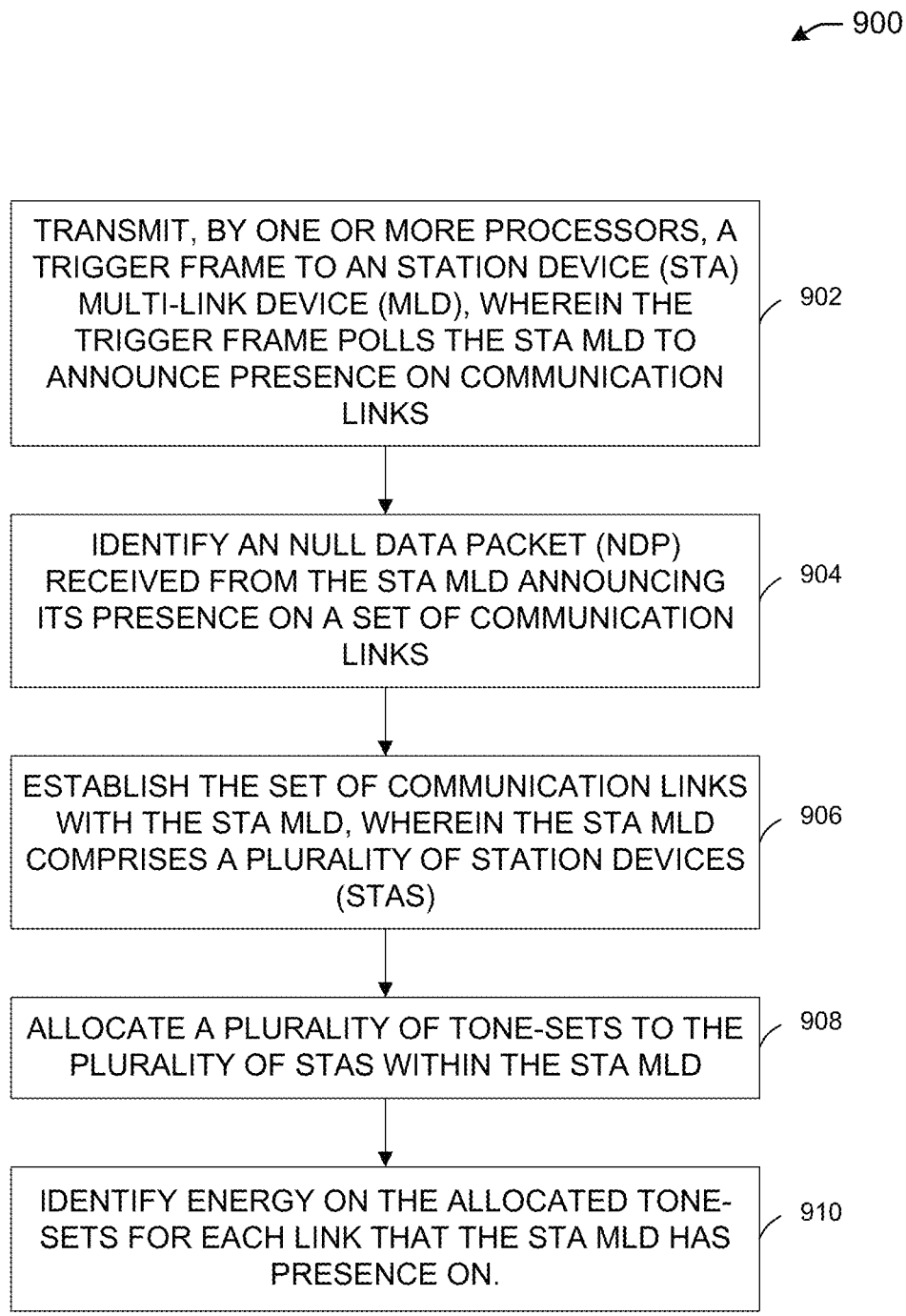
FIG. 9 illustrates a flow diagram of an illustrative process for an illustrative multi-link acknowledgments system, in accordance with one or more example embodiments of the present disclosure.

FIG. 9 illustrates a flow diagram of illustrative process 900 for a multi-link acknowledgments system, in accordance with one or more example embodiments of the present disclosure.

At block 902, a device (e.g., the user device(s) 120 and/or the AP 102 of FIG. 1A) may transmit a trigger frame to a station device (STA) multi-link device (MLD), wherein the trigger frame polls the STA MLD to announce presence on communication links.

At block 904, the device may identify a null data packet (NDP) from the STA MLD announcing its presence on a set of communication links.

At block 906, the device may establish the set of communication links with the STA MLD, wherein the STA MLD comprises a plurality of station devices (STAs).

At block 908, the device may allocate a plurality of tone-sets to the plurality of STAs within the STA MLD.

At block 910, the device may identify energy on the allocated tone-sets for each link that the STA MLD has a presence on. The presence on the set of communication links is announced in a link bitmap included in a user information field associated with the trigger frame. A bit in the link bitmap is set to 1 to indicate that information on a first link is being solicited. The trigger frame is a multiple link (ML) NDP feedback report poll (NFRP) trigger frame. The device may send a management frame to the STA MLD including information associated with a time-frequency allocation for a frame. The information about the time-frequency allocation is included in a control frame aggregated with a data frame. Each of the plurality of STAs selects the identified energy.

It is understood that the above descriptions are for purposes of illustration and are not meant to be limiting.

FIG. 10 shows a functional diagram of an exemplary communication station 1000, in accordance with one or more example embodiments of the present disclosure. In one embodiment, FIG. 10 illustrates a functional block diagram of a communication station that may be suitable for use as an AP 102 (FIG. 1A) or a user device 120 (FIG. 1A) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a multi-link acknowledgments device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). A baseband processor may carry out the operations in accordance with one or more example embodiments of the present disclosure. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the multi-link acknowledgments device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The multi-link acknowledgments device 1119 may carry out or perform any of the operations and processes (e.g., process 900) described and shown above.

It is understood that the above are only a subset of what the multi-link acknowledgments device 1119 may be configured to perform and that other functions included throughout this disclosure may also be performed by the multi-link acknowledgments device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
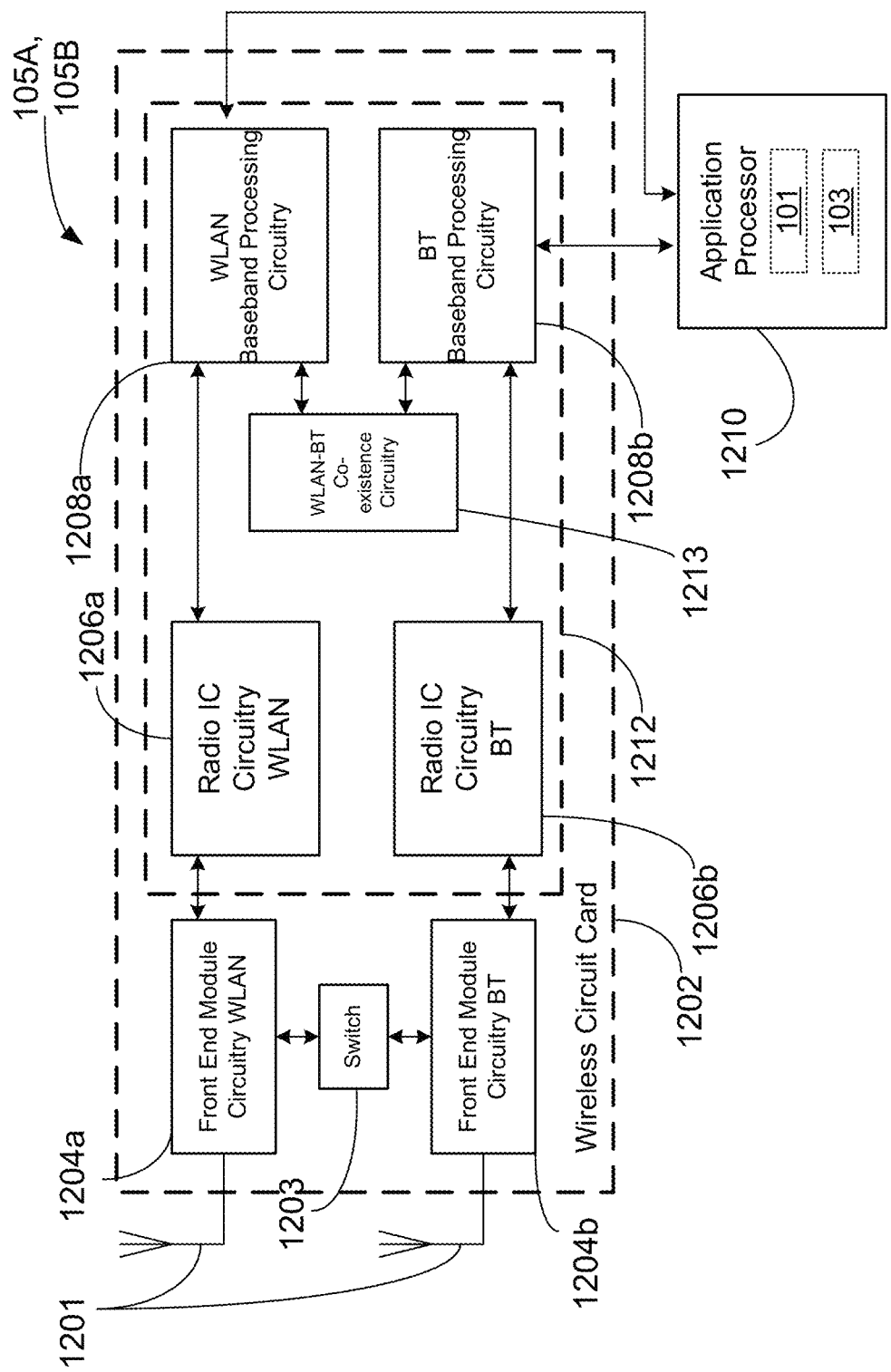
FIG. 12 is a block diagram of a radio architecture in accordance with some examples.

FIG. 12 is a block diagram of a radio architecture 105A, 105B in accordance with some embodiments that may be implemented in any one of the example AP 102 and/or the example STA 120 of FIG. 1A. Radio architecture 105A, 105B may include radio front-end module (FEM) circuitry 1204a-b, radio IC circuitry 1206a-b and baseband processing circuitry 1208a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204*b* and provide baseband signals to BT baseband processing circuitry 1208*b*. WLAN radio IC circuitry 1206*a* may also include a transmit signal path which may include circuitry to up-convert WLAN baseband signals provided by the WLAN baseband processing circuitry 1208*a* and provide WLAN RF output signals to the FEM circuitry 1204*a* for subsequent wireless transmission by the one or more antennas 1201. BT radio IC circuitry 1206*b* may also include a transmit signal path which may include circuitry to up-convert BT baseband signals provided by the BT baseband processing circuitry 1208*b* and provide BT RF output signals to the FEM circuitry 1204*b* for subsequent wireless transmission by the one or more antennas 1201. In the embodiment of FIG. 12, although radio IC circuitries 1206*a* and 1206*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208*a-b* may include a WLAN baseband processing circuitry 1208*a* and a BT baseband processing circuitry 1208*b*. The WLAN baseband processing circuitry 1208*a* may include a memory, such as, for example, a set of RAM arrays in a Fast Fourier Transform or Inverse Fast Fourier Transform block (not shown) of the WLAN baseband processing circuitry 1208*a*. Each of the WLAN baseband circuitry 1208*a* and the BT baseband circuitry 1208*b* may further include one or more processors and control logic to process the signals received from the corresponding WLAN or BT receive signal path of the radio IC circuitry 1206*a-b*, and to also generate corresponding WLAN or BT baseband signals for the transmit signal path of the radio IC circuitry 1206*a-b*. Each of the baseband processing circuitries 1208*a* and 1208*b* may further include physical layer (PHY) and medium access control layer (MAC) circuitry, and may further interface with a device for generation and processing of the baseband signals and for controlling operations of the radio IC circuitry 1206*a-b*.

Referring still to FIG. 12, according to the shown embodiment, WLAN-BT coexistence circuitry 1213 may include logic providing an interface between the WLAN baseband circuitry 1208*a* and the BT baseband circuitry 1208*b* to enable use cases requiring WLAN and BT coexistence. In addition, a switch 1203 may be provided between the WLAN FEM circuitry 1204*a* and the BT FEM circuitry 1204*b* to allow switching between the WLAN and BT radios according to application needs. In addition, although the antennas 1201 are depicted as being respectively connected to the WLAN FEM circuitry 1204*a* and the BT FEM circuitry 1204*b*, embodiments include within their scope the sharing of one or more antennas as between the WLAN and BT FEMs, or the provision of more than one antenna connected to each of FEM 1204*a* or 1204*b*.

In some embodiments, the front-end module circuitry 1204*a-b*, the radio IC circuitry 1206*a-b*, and baseband processing circuitry 1208*a-b* may be provided on a single radio card, such as wireless radio card 1202. In some other embodiments, the one or more antennas 1201, the FEM circuitry 1204*a-b* and the radio IC circuitry 1206*a-b* may be provided on a single radio card. In some other embodiments, the radio IC circuitry 1206*a-b* and the baseband processing circuitry 1208*a-b* may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1208*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
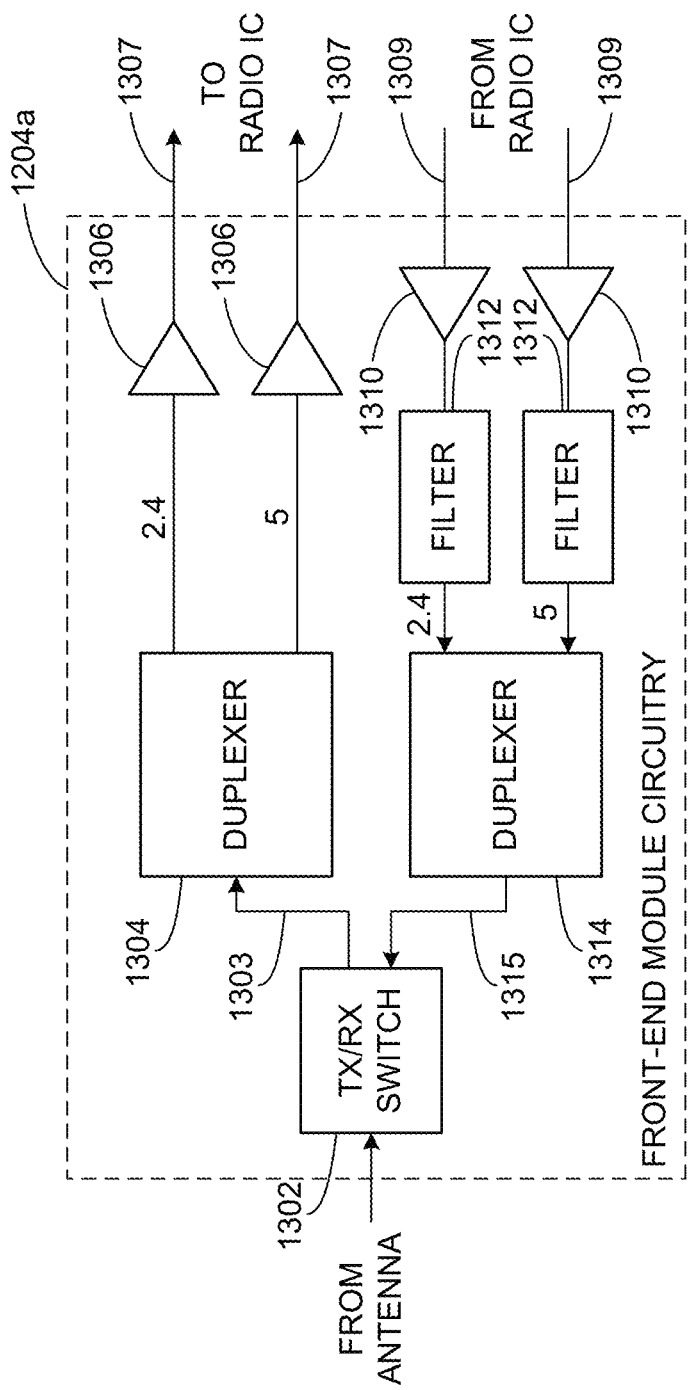
FIG. 13 illustrates an example front-end module circuitry for use in the radio architecture of FIG. 12, in accordance with one or more example embodiments of the present disclosure.

FIG. 13 illustrates WLAN FEM circuitry 1204*a* in accordance with some embodiments. Although the example of FIG. 13 is described in conjunction with the WLAN FEM circuitry 1204a, the example of FIG. 13 may be described in conjunction with the example BT FEM circuitry 1204b (FIG. 12), although other circuitry configurations may also be suitable.

In some embodiments, the FEM circuitry 1204a may include a TX/RX switch 1302 to switch between transmit mode and receive mode operation. The FEM circuitry 1204a may include a receive signal path and a transmit signal path. The receive signal path of the FEM circuitry 1204a may include a low-noise amplifier (LNA) 1306 to amplify received RF signals 1303 and provide the amplified received RF signals 1307 as an output (e.g., to the radio IC circuitry 1206a-b (FIG. 12)). The transmit signal path of the circuitry 1204a may include a power amplifier (PA) to amplify input RF signals 1309 (e.g., provided by the radio IC circuitry 1206a-b), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204a may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204a as the one used for WLAN communications.

Figure 14:
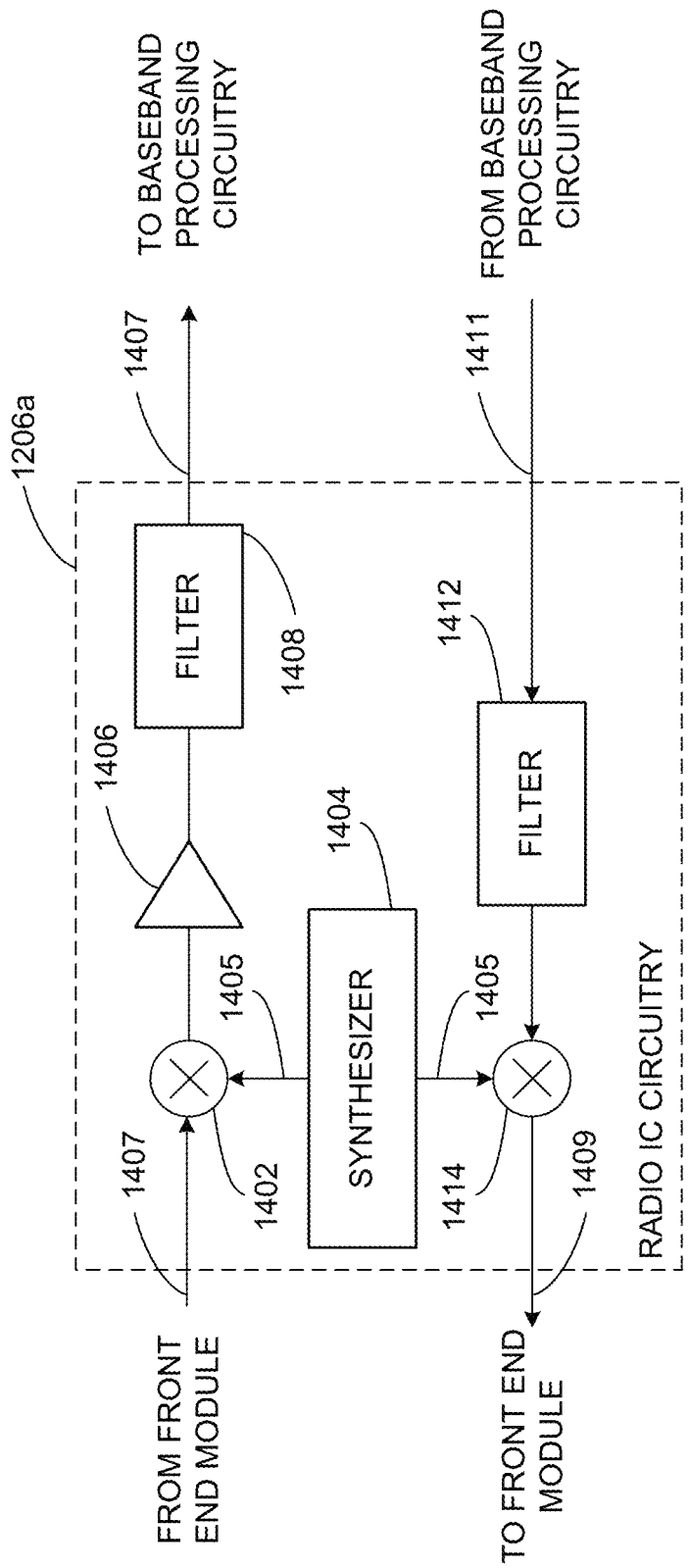
FIG. 14 illustrates an example radio IC circuitry for use in the radio architecture of FIG. 12, in accordance with one or more example embodiments of the present disclosure.

FIG. 14 illustrates radio IC circuitry 1206a in accordance with some embodiments. The radio IC circuitry 1206a is one example of circuitry that may be suitable for use as the WLAN or BT radio IC circuitry 1206a/1206b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, upconversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or upconversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct upconversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor Quadrature passive mixers may be driven by zero and ninety-degree time varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree the synthesizer may generate time-varying switching signals, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, a voltage-controlled oscillator (VCO) may provide frequency input into synthesizer circuitry 1404, although that is not a requirement. A divider control input may further be provided by either the baseband processing circuitry 1208*a-b* (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converter 101 or the example received signal converter 103 (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
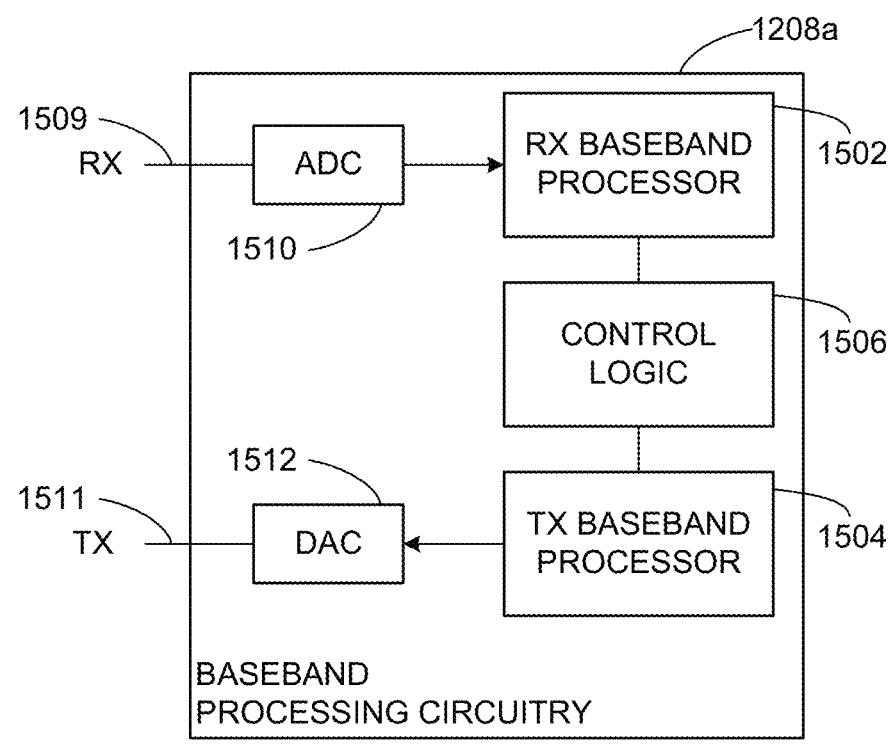
FIG. 15 illustrates an example baseband processing circuitry for use in the radio architecture of FIG. 12, in accordance with one or more example embodiments of the present disclosure.

FIG. 15 illustrates a functional block diagram of baseband processing circuitry 1208*a* in accordance with some embodiments. The baseband processing circuitry 1208*a* is one example of circuitry that may be suitable for use as the baseband processing circuitry 1208*a* (FIG. 12), although other circuitry configurations may also be suitable. Alternatively, the example of FIG. 14 may be used to implement the example BT baseband processing circuitry 1208*b* of FIG. 12.

The baseband processing circuitry 1208*a* may include a receive baseband processor (RX BBP) 1502 for processing receive baseband signals 1409 provided by the radio IC circuitry 1206*a-b* (FIG. 12) and a transmit baseband processor (TX BBP) 1504 for generating transmit baseband signals 1411 for the radio IC circuitry 1206*a-b*. The baseband processing circuitry 1208*a* may also include control logic 1506 for coordinating the operations of the baseband processing circuitry 1208*a*.

In some embodiments (e.g., when analog baseband signals are exchanged between the baseband processing circuitry 1208*a-b* and the radio IC circuitry 1206*a-b*), the baseband processing circuitry 1208*a* may include ADC 1510 to convert analog baseband signals 1509 received from the radio IC circuitry 1206*a-b* to digital baseband signals for processing by the RX BBP 1502. In these embodiments, the baseband processing circuitry 1208*a* may also include DAC 1512 to convert digital baseband signals from the TX BBP 1504 to analog baseband signals 1511.

In some embodiments that communicate OFDM signals or OFDMA signals, such as through baseband processor 1208*a*, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201, (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: transmit a trigger frame to a station device (STA) multi-link device (MLD), wherein the trigger frame polls the STA MLD to announce presence on communication links; identify a null data packet (NDP) from the STA MLD announcing its presence on a set of communication links; establish the set of communication links with the STA MLD, wherein the STA MLD comprises a plurality of station devices (STAs); allocate a plurality of tone-sets to the plurality of STAs within the STA MLD; and identify energy on the allocated tone-sets for each link that the STA MLD has presence on.

Example 2 may include the device of example 1 and/or some other example herein, wherein the presence on the set of communication links may be announced in a link bitmap included in a user information field associated with the trigger frame.

Example 3 may include the device of example 2 and/or some other example herein, wherein a bit in the link bitmap may be set to 1 to indicate that information on a first link may be being solicited.

Example 4 may include the device of example 1 and/or some other example herein, wherein the trigger frame may be a multiple link (ML) NDP feedback report poll (NFRP) trigger frame.

Example 5 may include the device of example 1 and/or some other example herein, wherein the processing circuitry may be further configured to cause to send a management frame to the STA MLD including information associated with a time-frequency allocation for a frame.

Example 6 may include the device of example 5 and/or some other example herein, wherein the information about the time-frequency allocation may be included in a control frame aggregated with a data frame.

Example 7 may include the device of example 1 and/or some other example herein, wherein each of the plurality of STAs may select the identified energy.

Example 8 may include a non-transitory computer-readable medium storing computer-executable instructions which when executed by one or more processors result in performing operations comprising: transmitting a trigger frame to a station device (STA) multi-link device (MLD), wherein the trigger frame polls the STA MLD to announce presence on communication links; identifying a null data packet (NDP) received from the STA MLD announcing its presence on a set of communication links; establishing the set of communication links with the STA MLD, wherein the STA MLD comprises a plurality of station devices (STAs); allocating a plurality of tone-sets to the plurality of STAs within the STA MLD; and identifying energy on the allocated tone-sets for each link that the STA MLD has presence on.

Example 9 may include the non-transitory computer-readable medium of example 8 and/or some other example herein, wherein the presence on the set of communication links may be announced in a link bitmap included in a user information field associated with the trigger frame.

Example 10 may include the non-transitory computer-readable medium of example 9 and/or some other example herein, wherein a bit in the link bitmap may be set to 1 to indicate that information on a first link may be being solicited.

Example 11 may include the non-transitory computer-readable medium of example 8 and/or some other example herein, wherein the trigger frame may be a multiple link (ML) NDP feedback report poll (NFRP) trigger frame.

Example 12 may include the non-transitory computer-readable medium of example 8 and/or some other example herein, wherein the operations further comprise causing to send a management frame to the STA MLD including information associated with a time-frequency allocation for a frame.

Example 13 may include the non-transitory computer-readable medium of example 12 and/or some other example herein, wherein the information about the time-frequency allocation may be included in a control frame aggregated with a data frame.

Example 14 may include the non-transitory computer-readable medium of example 8 and/or some other example herein, wherein each of the plurality of STAs may select the identified energy.

Example 15 may include a method comprising: transmitting a trigger frame to a station device (STA) multi-link device (MLD), wherein the trigger frame polls the STA MLD to announce presence on communication links; identifying a null data packet (NDP) received from the STA MLD announcing its presence on a set of communication links; establishing the set of communication links with the STA MLD, wherein the STA MLD comprises a plurality of station devices (STAs); allocating a plurality of tone-sets to the plurality of STAs within the STA MLD; and identifying energy on the allocated tone-sets for each link that the STA MLD has presence on.

Example 16 may include the method of example 15 and/or some other example herein, wherein the presence on the set of communication links may be announced in a link bitmap included in a user information field associated with the trigger frame.

Example 17 may include the method of example 16 and/or some other example herein, wherein a bit in the link bitmap may be set to 1 to indicate that information on a first link may be being solicited.

Example 18 may include the method of example 15 and/or some other example herein, wherein the trigger frame may be a multiple link (ML) NDP feedback report poll (NFRP) trigger frame.

Example 19 may include the method of example 15 and/or some other example herein, further comprising causing to send a management frame to the STA MLD including information associated with a time-frequency allocation for a frame.

Example 20 may include the method of example 19 and/or some other example herein, wherein the information about the time-frequency allocation may be included in a control frame aggregated with a data frame.

Example 21 may include the method of example 19 and/or some other example herein, wherein each of the plurality of STAs may select the identified energy.

Example 22 may include an apparatus comprising means for: transmitting a trigger frame to a station device (STA) multi-link device (MLD), wherein the trigger frame polls the STA MLD to announce presence on communication links; identifying a null data packet (NDP) received from the STA MLD announcing its presence on a set of communication links; establishing the set of communication links with the STA MLD, wherein the STA MLD comprises a plurality of station devices (STAs); allocating a plurality of tone-sets to the plurality of STAs within the STA MLD; and identifying energy on the allocated tone-sets for each link that the STA MLD has presence on.

Example 23 may include the apparatus of example 22 and/or some other example herein, wherein the presence on the set of communication links may be announced in a link bitmap included in a user information field associated with the trigger frame.

Example 24 may include the apparatus of example 22 and/or some other example herein, wherein a bit in the link bitmap may be set to 1 to indicate that information on a first link may be being solicited.

Example 25 may include the apparatus of example 22 and/or some other example herein, wherein the trigger frame may be a multiple link (ML) NDP feedback report poll (NFRP) trigger frame.

Example 26 may include the apparatus of example 22 and/or some other example herein, further comprising causing to send a management frame to the STA MLD including information associated with a time-frequency allocation for a frame.

Example 27 may include the apparatus of example 26 and/or some other example herein, wherein the information about the time-frequency allocation may be included in a control frame aggregated with a data frame.

Example 28 may include the apparatus of example 27 and/or some other example herein, wherein each of the plurality of STAs may select the identified energy.

Example 29 may include one or more non-transitory computer-readable media comprising instructions to cause an electronic device, upon execution of the instructions by one or more processors of the electronic device, to perform one or more elements of a method described in or related to any of examples 1-28, or any other method or process described herein.

Example 30 may include an apparatus comprising logic, modules, and/or circuitry to perform one or more elements of a method described in or related to any of examples 1-28, or any other method or process described herein.

Example 31 may include a method, technique, or process as described in or related to any of examples 1-28, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples 1-28, or portions thereof.

Example 33 may include a method of communicating in a wireless network as shown and described herein.

Example 34 may include a system for providing wireless communication as shown and described herein.

Example 35 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A device, the device comprising processing circuitry coupled to storage, the processing circuitry configured to:
    transmit a trigger frame to a station device (STA) multi-link device (MLD), wherein the trigger frame polls the STA MLD to announce presence on communication links;
    identify a null data packet (NDP) from the STA MLD announcing its presence on a set of communication links;
    establish the set of communication links with the STA MLD, wherein the STA MLD comprises a plurality of station devices (STAs);

allocate a plurality of tone-sets to the plurality of STAs within the STA MLD; and identify energy on the allocated tone-sets for each link that the STA MLD has presence on.

2. The device of claim 1, wherein the presence on the set of communication links is announced in a link bitmap included in a user information field associated with the trigger frame.

3. The device of claim 2, wherein a bit in the link bitmap is set to 1 to indicate that information on a first link is being solicited.

4. The device of claim 1, wherein the trigger frame is a multiple link (ML) NDP feedback report poll (NFRP) trigger frame.

5. The device of claim 1, wherein the processing circuitry is further configured to cause to send a management frame to the STA MLD including information associated with a time-frequency allocation for a frame.

6. The device of claim 5, wherein the information about the time-frequency allocation is included in a control frame aggregated with a data frame.

7. The device of claim 1, wherein the identified energy is selected by each of the plurality of STAs.

8. A non-transitory computer-readable medium storing computer-executable instructions which when executed by one or more processors result in performing operations comprising:

transmitting a trigger frame to a station device (STA) multi-link device (MLD), wherein the trigger frame polls the STA MLD to announce presence on communication links;

identifying a null data packet (NDP) received from the STA MLD announcing its presence on a set of communication links;

establishing the set of communication links with the STA MLD, wherein the STA MLD comprises a plurality of station devices (STAs);

allocating a plurality of tone-sets to the plurality of STAs within the STA MLD; and identifying energy on the allocated tone-sets for each link that the STA MLD has presence on.

9. The non-transitory computer-readable medium of claim 8, wherein the presence on the set of communication links is announced in a link bitmap included in a user information field associated with the trigger frame.

10. The non-transitory computer-readable medium of claim 9, wherein a bit in the link bitmap is set to 1 to indicate that information on a first link is being solicited.

11. The non-transitory computer-readable medium of claim 8, wherein the trigger frame is a multiple link (ML) NDP feedback report poll (NFRP) trigger frame.

12. The non-transitory computer-readable medium of claim 8, wherein the operations further comprise causing to send a management frame to the STA MLD including information associated with a time-frequency allocation for a frame.

13. The non-transitory computer-readable medium of claim 12, wherein the information about the time-frequency allocation is included in a control frame aggregated with a data frame.

14. The non-transitory computer-readable medium of claim 8, wherein the identified energy is selected by each of the plurality of STAs.

15. A method comprising:

transmitting, by one or more processors, a trigger frame to a station device (STA) multi-link device (MLD), wherein the trigger frame polls the STA MLD to announce presence on communication links;

identifying a null data packet (NDP) received from the STA MLD announcing its presence on a set of communication links;

establishing the set of communication links with the STA MLD, wherein the STA MLD comprises a plurality of station devices (STAs);

allocating a plurality of tone-sets to the plurality of STAs within the STA MLD; and identifying energy on the allocated tone-sets for each link that the STA MLD has presence on.

16. The method of claim 15, wherein the presence on the set of communication links is announced in a link bitmap included in a user information field associated with the trigger frame.

17. The method of claim 16, wherein a bit in the link bitmap is set to 1 to indicate that information on a first link is being solicited.

18. The method of claim 15, wherein the trigger frame is a multiple link (ML) NDP feedback report poll (NFRP) trigger frame.

19. The method of claim 15, further comprising causing to send a management frame to the STA MLD including information associated with a time-frequency allocation for a frame.

20. The method of claim 19, wherein the information about the time-frequency allocation is included in a control frame aggregated with a data frame.

* * * * *